US012560165B2

(12) United States Patent　(10) Patent No.:　US 12,560,165 B2
Marquez et al.　(45) Date of Patent:　Feb. 24, 2026

(54) PUMP ASSEMBLY USING A SHELL BEARING WITH A PARTIAL GROOVE

(71) Applicant: SPM Oil & Gas Inc., Fort Worth, TX (US)

(72) Inventors: John S. Marquez, Saginaw, TX (US); Alireza Atabaie, Keller, TX (US); John Mccrady, Burleson, TX (US); Chandu Kumar, Fort Worth, TX (US); Chih Hau Chen, Plano, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 283 days.

(21) Appl. No.: 18/540,273

(22) Filed: Dec. 14, 2023

(65) Prior Publication Data

US 2024/0254987 A1　Aug. 1, 2024

Related U.S. Application Data

(60) Provisional application No. 63/482,194, filed on Jan. 30, 2023.

(51) Int. Cl.
| | |
|---|---|
| *F04B 53/18* | (2006.01) |
| *E21B 43/26* | (2006.01) |
| *F16C 33/10* | (2006.01) |

(52) U.S. Cl.
CPC .......... *F04B 53/18* (2013.01); *F16C 33/1065* (2013.01); *E21B 43/2607* (2020.05); *F16C 2360/42* (2013.01)

(58) Field of Classification Search
CPC .......... F04B 53/16; F04B 19/22; F04B 37/12; F04B 53/006; F04B 53/18; E21B 43/2607; F16C 2360/42; F16C 7/023; F16C 33/1065; F16C 3/14
USPC .................................................. 384/288, 291
See application file for complete search history.

(56) References Cited

U.S. PATENT DOCUMENTS

| | | |
|---|---|---|
| 6,907,848 B2 | 6/2005 | Beardmore |
| 10,690,176 B2 | 6/2020 | Leone et al. |

FOREIGN PATENT DOCUMENTS

| | | |
|---|---|---|
| AT | 12881 U1 | 1/2013 |

*Primary Examiner* — Mark A Laurenzi
*Assistant Examiner* — Benjamin Doyle

(57)　　　　ABSTRACT

A pump assembly may include a bearing housing having a bore. The pump assembly may include a connecting rod connected to the bearing housing at a first end of the connecting rod and connected to a crosshead at a second end of the connecting rod via a wrist pin. The connecting rod may include a lubrication channel that extends within the connecting rod. The pump assembly may include a shell bearing in the bore of the bearing housing, the shell bearing having an inner surface and an outer surface. A portion of the inner surface of the shell bearing that contacts the crankshaft in a forward stroke of the crosshead may be uninterrupted by a groove or an aperture configured to direct lubrication fluid to the lubrication channel of the connecting rod.

18 Claims, 6 Drawing Sheets

PUMP ASSEMBLY USING A SHELL BEARING WITH A PARTIAL GROOVE

CROSS-REFERENCE TO RELATED APPLICATION

This patent application claims priority to U.S. Provisional Patent Application No. 63/482,194, filed on Jan. 30, 2023, and entitled "PUMP ASSEMBLY USING A SHELL BEARING WITH A PARTIAL GROOVE." The disclosure of the prior application is considered part of and is incorporated by reference into this patent application.

TECHNICAL FIELD

The present disclosure relates generally to reciprocating pumps and, for example, to a pump assembly using a shell bearing with a partial groove.

BACKGROUND

Hydraulic fracturing is a well stimulation technique that typically involves pumping fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids.

A hydraulic fracturing system may employ one or more high-pressure reciprocating pumps for pressurizing fracturing fluid. In operation of a reciprocating pump, the fracturing fluid is caused to flow into and out of a pump housing having a fluid chamber as a consequence of the reciprocation of a piston-like plunger respectively moving away from and toward the fluid chamber. The plunger may be driven by a crankshaft, and the crankshaft may be retained in a shell bearing that facilitates mechanical coupling of the crankshaft to a connecting rod, that is in turn mechanically coupled to the plunger.

One or more lubrication systems may be employed to supply lubrication fluid to rolling and/or sliding surfaces of the reciprocating pump. For example, a lubrication system may be configured to supply lubrication fluid to the shell bearing, and to direct the lubrication fluid from the shell bearing to a wrist pin and a knuckle bearing at a forward end of the connecting rod. The shell bearing may include a lubrication groove, extending around an inner surface of the shell bearing, to facilitate movement of the lubrication fluid around the shell bearing. However, the lubrication groove reduces a surface area of the shell bearing, thereby reducing a load capacity and a useful life of the shell bearing. For example, load on the shell bearing from the crankshaft may be more likely to damage the shell bearing due to the lubrication groove.

The pump assembly of the present disclosure solves one or more of the problems set forth above and/or other problems in the art.

SUMMARY

A pump assembly may include a bearing housing having a bore to receive a crankshaft. The pump assembly may include a connecting rod connected to the bearing housing at a first end of the connecting rod and connected to a crosshead at a second end of the connecting rod via a wrist pin.

The connecting rod may include a lubrication channel that extends within the connecting rod. The pump assembly may include a shell bearing in the bore of the bearing housing retaining the crankshaft. The shell bearing may have an inner surface, an outer surface, a groove that extends only partially around the inner surface of the shell bearing on a side of the shell bearing opposite the connecting rod, and an aperture located in the groove, the aperture extending from the inner surface to the outer surface of the shell bearing on the side of the shell bearing opposite the connecting rod. The pump assembly may include a lubrication conduit fluidly connecting the aperture in the shell bearing to the lubrication channel in the connecting rod.

A pump assembly may include a bearing housing having a bore configured to receive a crankshaft. The pump assembly may include a connecting rod connected to the bearing housing at a first end of the connecting rod and connected to a crosshead at a second end of the connecting rod via a wrist pin. The connecting rod may include a lubrication channel that extends within the connecting rod. The pump assembly may include a shell bearing in the bore of the bearing housing retaining the crankshaft, the shell bearing having an inner surface and an outer surface. The pump assembly may include a lubrication conduit fluidly connected to the lubrication channel in the connecting rod between the second end of the connecting rod and an end of the lubrication channel at the first end of the connecting rod.

A pump assembly may include a bearing housing having a bore. The pump assembly may include a connecting rod connected to the bearing housing at a first end of the connecting rod and connected to a crosshead at a second end of the connecting rod via a wrist pin. The connecting rod may include a lubrication channel that extends within the connecting rod. The pump assembly may include a shell bearing in the bore of the bearing housing, the shell bearing having an inner surface and an outer surface. A portion of the inner surface of the shell bearing that contacts the crankshaft in a forward stroke of the crosshead may be uninterrupted by a groove or an aperture configured to direct lubrication fluid to the lubrication channel of the connecting rod.

DETAILED DESCRIPTION

Figure 1:
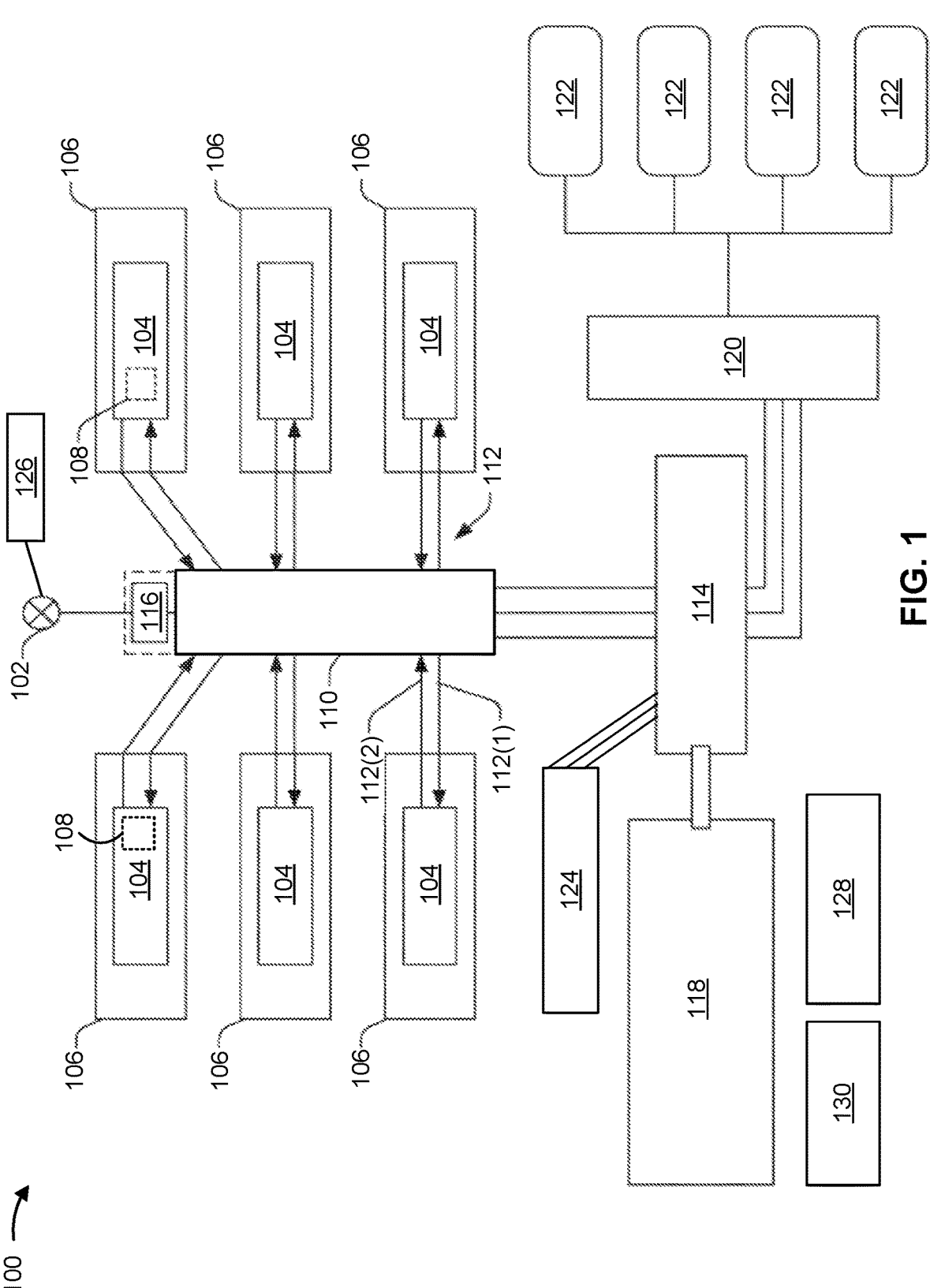
FIG. 1 is a diagram illustrating an example hydraulic fracturing system.

FIG. 1 is a diagram illustrating an example hydraulic fracturing system 100. For example, FIG. 1 depicts a plan view of an example hydraulic fracturing site along with equipment that is used during a hydraulic fracturing process. In some examples, less equipment, additional equipment, or alternative equipment to the example equipment depicted in FIG. 1 may be used to conduct the hydraulic fracturing process.

The hydraulic fracturing system 100 includes a well 102. Hydraulic fracturing is a well-stimulation technique that uses high-pressure injection of fracturing fluid into the well 102 and corresponding wellbore in order to hydraulically fracture a rock formation surrounding the wellbore. While the description provided herein describes hydraulic fracturing in the context of wellbore stimulation for oil and gas production, the description herein is also applicable to other uses of hydraulic fracturing.

High-pressure injection of the fracturing fluid may be achieved by one or more pump systems 104 that may be mounted (or housed) on one or more hydraulic fracturing trailers 106 (which also may be referred to as "hydraulic fracturing rigs") of the hydraulic fracturing system 100. Each of the pump systems 104 includes at least one pump 108 (referred to herein collectively, as "pumps 108" and individually as "a pump 108"). The pumps 108 may be hydraulic fracturing pumps. The pumps 108 may include various types of high-volume hydraulic fracturing pumps such as triplex or quintuplex pumps. Additionally, or alternatively, the pumps 108 may include other types of reciprocating positive-displacement pumps or gear pumps. A type and/or a configuration of the pumps 108 may vary depending on the fracture gradient of the rock formation that will be hydraulically fractured, the quantity of pumps 108 used in the hydraulic fracturing system 100, the flow rate necessary to complete the hydraulic fracture, the pressure necessary to complete the hydraulic fracture, or the like. The hydraulic fracturing system 100 may include any number of trailers 106 having pumps 108 thereon in order to pump hydraulic fracturing fluid at a predetermined rate and pressure.

In some examples, the pumps 108 may be in fluid communication with a manifold 110 via various fluid conduits 112, such as flow lines, pipes, or other types of fluid conduits. The manifold 110 combines fracturing fluid received from the pumps 108 prior to injecting the fracturing fluid into the well 102. The manifold 110 also distributes fracturing fluid to the pumps 108 that the manifold 110 receives from a blender 114 of the hydraulic fracturing system 100. In some examples, the various fluids are transferred between the various components of the hydraulic fracturing system 100 via the fluid conduits 112. The fluid conduits 112 include low-pressure fluid conduits 112(1) and high-pressure fluid conduits 112(2). In some examples, the low-pressure fluid conduits 112(1) deliver fracturing fluid from the manifold 110 to the pumps 108, and the high-pressure fluid conduits 112(2) transfer high-pressure fracturing fluid from the pumps 108 to the manifold 110.

The manifold 110 also includes a fracturing head 116. The fracturing head 116 may be included on a same support structure as the manifold 110. The fracturing head 116 receives fracturing fluid from the manifold 110 and delivers the fracturing fluid to the well 102 (via a well head mounted on the well 102) during a hydraulic fracturing process. In some examples, the fracturing head 116 may be fluidly connected to multiple wells.

The blender 114 combines proppant received from a proppant storage unit 118 with fluid received from a hydration unit 120 of the hydraulic fracturing system 100. In some examples, the proppant storage unit 118 may include a dump truck, a truck with a trailer, one or more silos, or other types of containers. The hydration unit 120 receives water from one or more water tanks 122. In some examples, the hydraulic fracturing system 100 may receive water from water pits, water trucks, water lines, and/or any other suitable source of water. The hydration unit 120 may include one or more tanks, pumps, gates, or the like.

The hydration unit 120 may add fluid additives, such as polymers or other chemical additives, to the water. Such additives may increase the viscosity of the fracturing fluid prior to mixing the fluid with proppant in the blender 114. The additives may also modify a pH of the fracturing fluid to an appropriate level for injection into a targeted formation surrounding the wellbore. Additionally, or alternatively, the hydraulic fracturing system 100 may include one or more fluid additive storage units 124 that store fluid additives. The fluid additive storage unit 124 may be in fluid communication with the hydration unit 120 and/or the blender 114 to add fluid additives to the fracturing fluid.

In some examples, the hydraulic fracturing system 100 may include a balancing pump 126. The balancing pump 126 provides balancing of a differential pressure in an annulus of the well 102. The hydraulic fracturing system 100 may include a data monitoring system 128. The data monitoring system 128 may manage and/or monitor the hydraulic fracturing process performed by the hydraulic fracturing system 100 and the equipment used in the process. In some examples, the management and/or monitoring operations may be performed from multiple locations. The data monitoring system 128 may be supported on a van, a truck, or may be otherwise mobile. The data monitoring system 128 may include a display for displaying data for monitoring performance and/or optimizing operation of the hydraulic fracturing system 100. In some examples, the data gathered by the data monitoring system 128 may be sent off-board or off-site for monitoring performance and/or performing calculations relative to the hydraulic fracturing system 100.

The hydraulic fracturing system 100 includes a controller 130. The controller 130 may be a system-wide controller for the hydraulic fracturing system 100 or a pump-specific controller for a pump system 104. The controller 130 may be communicatively coupled (e.g., by a wired connection or a wireless connection) with one or more of the pump systems 104. The controller 130 may also be communicatively coupled with other equipment and/or systems of the hydraulic fracturing system 100. The controller 130 may include one or more memories and/or one or more processors.

As indicated above, FIG. 1 is provided as an example. Other examples may differ from what is described with regard to FIG. 1.

Figure 2:
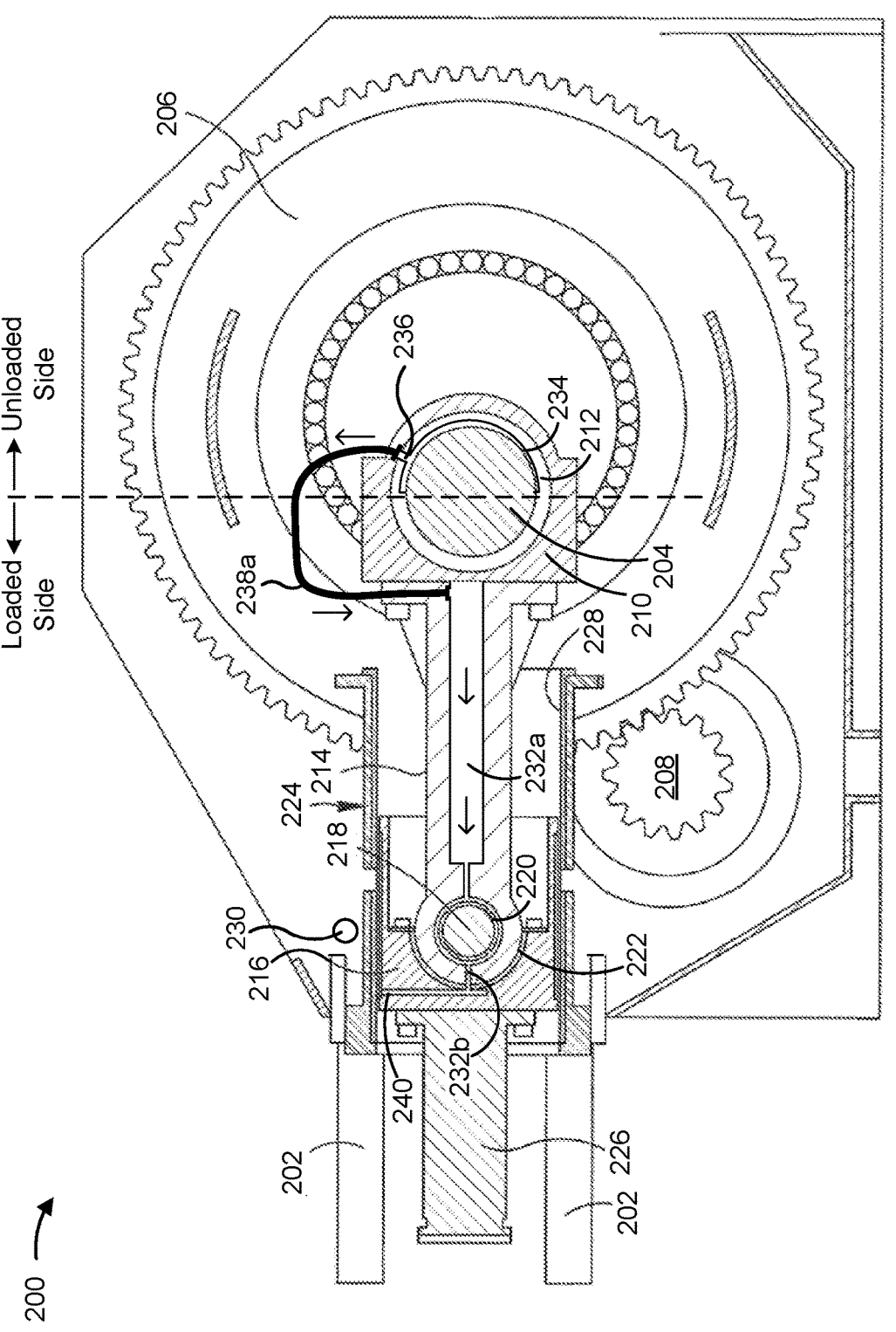
FIG. 2 is a diagram illustrating a sectional view of an example pump assembly.

FIG. 2 is a diagram illustrating a sectional view of an example pump assembly 200 (e.g., a reciprocating pump assembly). In particular, the pump assembly 200 shown in FIG. 2 includes a power section of a reciprocating pump that may be connected to a fluid section (not shown) having at least one plunger for at least one fluid chamber to form the reciprocating pump. For example, the power section may drive the plunger in a reciprocating motion. In some implementations, the pump assembly 200 may include, may be included in, or may correspond to the pump 108 of the hydraulic fracturing system 100.

As shown, the pump assembly 200 includes a plurality of stay rods 202 configured for connection with the fluid section. The pump assembly 200 includes a crankshaft 204 that is rotated by a gearbox output 206, which is illustrated as a single gear but may be more than one gear. A gearbox input 208 is coupled to a transmission (not shown) and a power source (not shown), such as a diesel engine, to rotate the gearbox input 208 during operation.

A bearing housing 210 includes a bore that receives the crankshaft 204. A shell bearing 212 in the bore of the bearing housing 210 is between the crankshaft 204 and the bearing housing 210 and retains the crankshaft 204. For example, the shell bearing 212 may surround an end of the crankshaft 204 that is received in the bearing housing 210.

An end of the bearing housing 210 is connected to a connecting rod 214. The connecting rod 214 is connected to the bearing housing 210 at a first end of the connecting rod 214 and connected to a crosshead 216 at a second end of the connecting rod 214 via a wrist pin 218 that is retained in a wrist pin bearing 220. The wrist pin 218 holds the connecting rod 214 and allows the connecting rod 214 to pivot in a recess in the crosshead 216. A knuckle is defined at an interface of the second end of the connecting rod 214 and the crosshead 216, and a knuckle bearing 222 is disposed between the connecting rod 214 and the crosshead 216 at the knuckle. In this way, the connecting rod 214 mechanically couples the crankshaft 204 and the crosshead 216. The wrist pin 218, the wrist pin bearing 220, and the knuckle bearing 222 facilitate coupling and motion between the connecting rod 214 and the crosshead 216.

The crosshead 216 is disposed in a crosshead housing 224, which constrains the crosshead 216 to linear reciprocating movement. A pony rod 226 connects to the crosshead 216 at one end of the pony rod 226 and may be connected to the plunger of the fluid section at an opposite end of the pony rod 226 (or the plunger may be directly coupled to the crosshead 216) to enable reciprocating movement of the plunger. The crankshaft 204 is configured to drive the crosshead 216 linearly within the crosshead housing 224. A sliding surface, such as a bushing 228 as shown in FIG. 2, is disposed between the crosshead 216 and an inner surface of the crosshead housing 224. The bushing 228 may be replaceable and formed of, or coated with, bronze or a similar material to reduce friction that would otherwise exist between the crosshead 216 and the crosshead housing 224.

The pump assembly 200 may include a lubrication bar 230 configured to supply lubrication fluid (e.g., oil) to a plurality of lubrication conduits. For example, a lubrication conduit (e.g., a hose) may fluidly connect the lubrication bar 230 and the crankshaft 204, and the crankshaft 204 may be configured to discharge lubrication fluid (received from the lubrication bar 230) into the shell bearing 212. As another example, a lubrication conduit (e.g., a hose) may fluidly connect the lubrication bar 230 and the crosshead 216. The lubrication bar 230 may be configured to receive pressurized lubrication fluid from one or more fluid pumps (not shown). The lubrication bar 230 may supply high pressure lubrication fluid to one or more lubrication conduits and/or lubrication channels described herein. For example, the lubrication fluid may have a pressure in a range from 80 to 120 psi.

The connecting rod 214 includes a lubrication channel 232 (shown as 232*a* and 232*b*) that extends within the connecting rod 214. For example, the lubrication channel 232 may extend lengthwise along the connecting rod 214 (e.g., being in fluid contact (direct or indirect) with an interior surface or cavity of the connecting rod 214). For example, the lubrication channel 232 may extend from the first end of the connecting rod 214 to the second end of the connecting rod 214. In particular, the lubrication channel 232 may include a first portion 232*a* that extends from the first end of the connecting rod 214 toward the wrist pin 218 and a second portion 232*b* that extends from the second end of the connecting rod 214 toward the wrist pin 218. The first portion 232*a* and the second portion 232*b* may be fluidly connected to each other. As shown, the first portion 232*a* may include a wider section (e.g., having a greater diameter) that reduces in size to a narrower section (e.g., having a lesser diameter) toward the wrist pin 218. The lubrication channel 232 may be configured to direct lubrication fluid to at least the knuckle bearing 222 at the knuckle defined by the connecting rod 214 and the crosshead 216. For example, in operation, lubrication fluid may travel through the first portion 232*a* to the wrist pin 218 and/or the wrist pin bearing 220, and from there, travel through the second portion 232*b* to the knuckle bearing 222.

The connecting rod 214 may be configured to linearly reciprocate the crosshead 216 in a forward stroke and a reverse stroke responsive to rotation of the crankshaft 204. In the forward stroke, the crankshaft 204 may contact a side of the shell bearing 212 facing the connecting rod 214 (a forward side of the shell bearing 212), which may be referred to as a "loaded side" of the shell bearing 212. A side of the shell bearing 212 opposite the connecting rod 214 (a back side of the shell bearing 212), which may receive lesser impact from the crankshaft 204 in the reverse stroke, may be referred to as an "unloaded side" of the shell bearing 212. A side of the shell bearing 212 may include a semi-cylinder segment of the shell bearing 212.

The shell bearing 212 (shown further in FIG. 6) has an inner surface and an outer surface. The shell bearing 212 may include a groove 234 that is configured to direct the flow of lubrication fluid that is supplied to the shell bearing 212 (e.g., from the lubrication bar 230 via the crankshaft 204). The groove 234 may extend only partially around the inner surface of the shell bearing 212 on the side of the shell bearing 212 opposite the connecting rod 214 (the unloaded side of the shell bearing 212). Thus, the groove 234 may not extend to the side of the shell bearing 212 facing the connecting rod 214 (the loaded side of the shell bearing 212). For example, the groove 234 may extend partially around the inner surface of the shell bearing 212 where the inner surface of the shell bearing 212 is uncontacted by the crankshaft 204 in the forward stroke. As an example, a groove may be absent from a first portion of the inner surface of the shell bearing 212 that contacts the crankshaft 204 in the forward stroke, and the groove 234 may be present in a second portion of the inner surface of the shell bearing 212 that does not contact the crankshaft 204 in the forward stroke (e.g., the second portion contacts the crankshaft 204 in the reverse stroke). The groove 234 may extend halfway around the inner surface of the shell bearing 212 or less than halfway around the inner surface of the shell bearing 212. In this way, a surface area of the loaded side of the shell bearing 212 is not interrupted by the groove 234, and thus has greater strength to handle impact from the crankshaft 204 in the forward stroke.

An aperture 236 may extend through the shell bearing 212 from the inner surface to the outer surface of the shell bearing 212. The aperture 236 may be configured to transport lubrication fluid from the inner surface of the shell bearing 212 to outside of the shell bearing 212. The aperture 236 may be located on the side of the shell bearing 212 opposite the connecting rod 214 (the unloaded side of the shell bearing 212). For example, the aperture 236 may be located in the groove 234, such that lubrication fluid in the groove 234 can be transported from the shell bearing 212 via the aperture 236. In some implementations, an aperture may be absent in the side of the shell bearing 212 facing the connecting rod 214 (the loaded side of the shell bearing 212). As an example, an aperture may be absent from the first portion of the inner surface of the shell bearing 212 that contacts the crankshaft 204 in the forward stroke. Thus, the first portion of the inner surface of the shell bearing 212, that contacts the crankshaft 204 in the forward stroke, may be uninterrupted by a groove or an aperture configured to direct lubrication fluid to the lubrication channel 232 of the connecting rod 214. For example, the inner surface of the shell bearing 212, at the loaded side of the shell bearing 212 (e.g., the first portion of the inner surface of the shell bearing 212 that contacts the crankshaft 204 in the forward stroke), may be featureless, or otherwise smooth or uninterrupted.

The pump assembly 200 may include a lubrication conduit 238a that fluidly connects the aperture 236 of the shell bearing 212 to the lubrication channel 232 in the connecting rod 214. For example, the lubrication conduit 238a may be configured to transport lubrication fluid from the unloaded side of the shell bearing 212 (e.g., lubrication fluid accumulated in the groove 234), via the aperture 236, to the lubrication channel 232 of the connecting rod 214. The lubrication conduit 238a may extend, from a section of the shell bearing 212 having the groove 234, to the lubrication channel 232. The lubrication conduit 238a may fluidly connect to the lubrication channel 232 at a location between the second end of the connecting rod 214 and an end of the lubrication channel 232 at the first end of the connecting rod 214 (e.g., where the connecting rod 214 abuts the bearing housing 210). As an example, the lubrication conduit 238a may fluidly connect to the lubrication channel 232 through a side wall of the connecting rod 214 (e.g., downstream from the end of the lubrication channel 232). For example, the lubrication conduit 238a may fluidly connect to the first portion 232a that extends from the first end of the connecting rod 214 toward the wrist pin 218. As an example, the lubrication conduit 238a may fluidly connect to the wider section of the lubrication channel 232, as described above.

Moreover, at least a portion of the lubrication conduit 238a may be external to the bearing housing 210 and the connecting rod 214. In contrast, in other pump assemblies, a fluid connection between a lubrication channel of a connecting rod and a shell bearing may be made via a lubrication channel, internal to a bearing housing, that connects an aperture at a loaded side of the shell bearing and an end of the lubrication channel. In some implementations, the lubrication conduit 238a may be a flexible hose or a rigid tube.

In some implementations, a lubrication channel 240 may extend within the crosshead 216 to supply lubrication fluid to the wrist pin 218, the wrist pin bearing 220, and/or the knuckle bearing 222 via the second portion 232b of the lubrication channel 232. The lubrication channel 240 may receive lubrication fluid supplied to the crosshead 216 from the lubrication bar 230, as described herein. Lubrication fluid may flow from the lubrication channel 240 through the second portion 232b of the lubrication channel 232 in an opposite direction than a direction in which lubrication fluid may flow from the lubrication conduit 238a through the first portion 232a of the lubrication channel 232 (as shown by arrows in FIG. 2).

In some implementations, a groove and an aperture may be absent from at least the loaded side of the shell bearing 212, and the bearing housing 210 may include a groove that fluidly connects to the lubrication channel 232 of the connecting rod 214 (e.g., via a lubrication passage between the groove and the lubrication channel 232). For example, the groove in the bearing housing 210, that is fluidly connected to the lubrication channel 232, may also fluidly connect to the aperture 236 in the shell bearing 212. As another example, the groove in the bearing housing 210, that is fluidly connected to the lubrication channel 232, may also fluidly connect to the crankshaft 204, and the groove 234 and the aperture 236 may be entirely absent from the shell bearing 212.

As indicated above, FIG. 2 is provided as an example. Other examples may differ from what is described with regard to FIG. 2.

Figure 3:
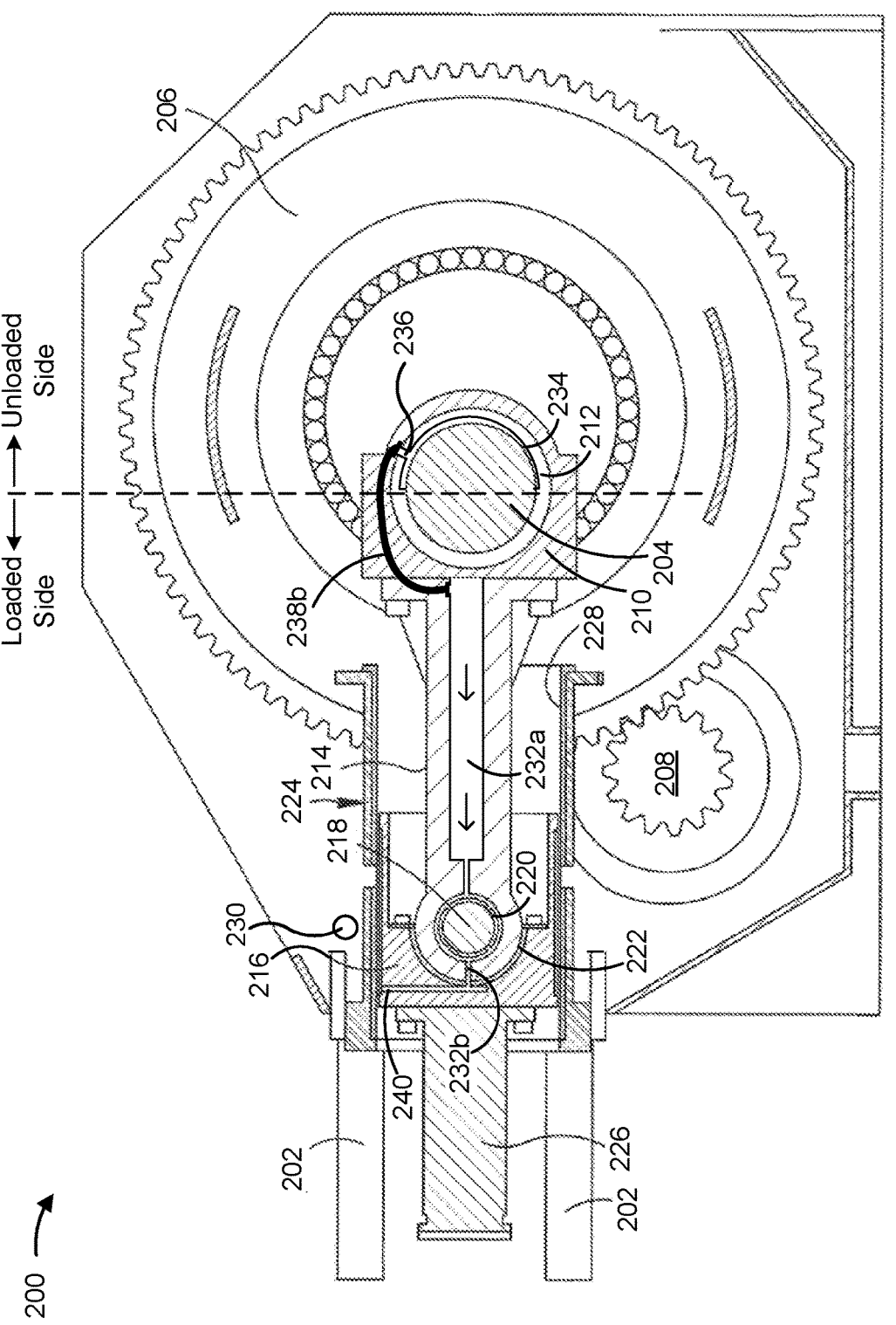
FIG. 3 is a diagram illustrating a sectional view of an alternative example of the pump assembly of FIG. 2.

FIG. 3 is a diagram illustrating a sectional view of an alternative example of the pump assembly 200. As shown in FIG. 3, the pump assembly 200 may include a lubrication conduit 238b that fluidly connects the aperture 236 of the shell bearing 212 to the lubrication channel 232 in the connecting rod 214, in a similar manner as described in connection with FIG. 2. The lubrication conduit 238b may be a channel within the bearing housing 210 and the connecting rod 214. For example, the lubrication conduit 238b may be configured to transport lubrication fluid from the unloaded side of the shell bearing 212, via the aperture 236, to the lubrication channel 232 of the connecting rod 214 internally through the bearing housing 210 and the connecting rod 214. The lubrication conduit 238b may extend, from a section of the shell bearing 212 having the groove 234, to the lubrication channel 232.

As indicated above, FIG. 3 is provided as an example. Other examples may differ from what is described with regard to FIG. 3.

Figure 4:
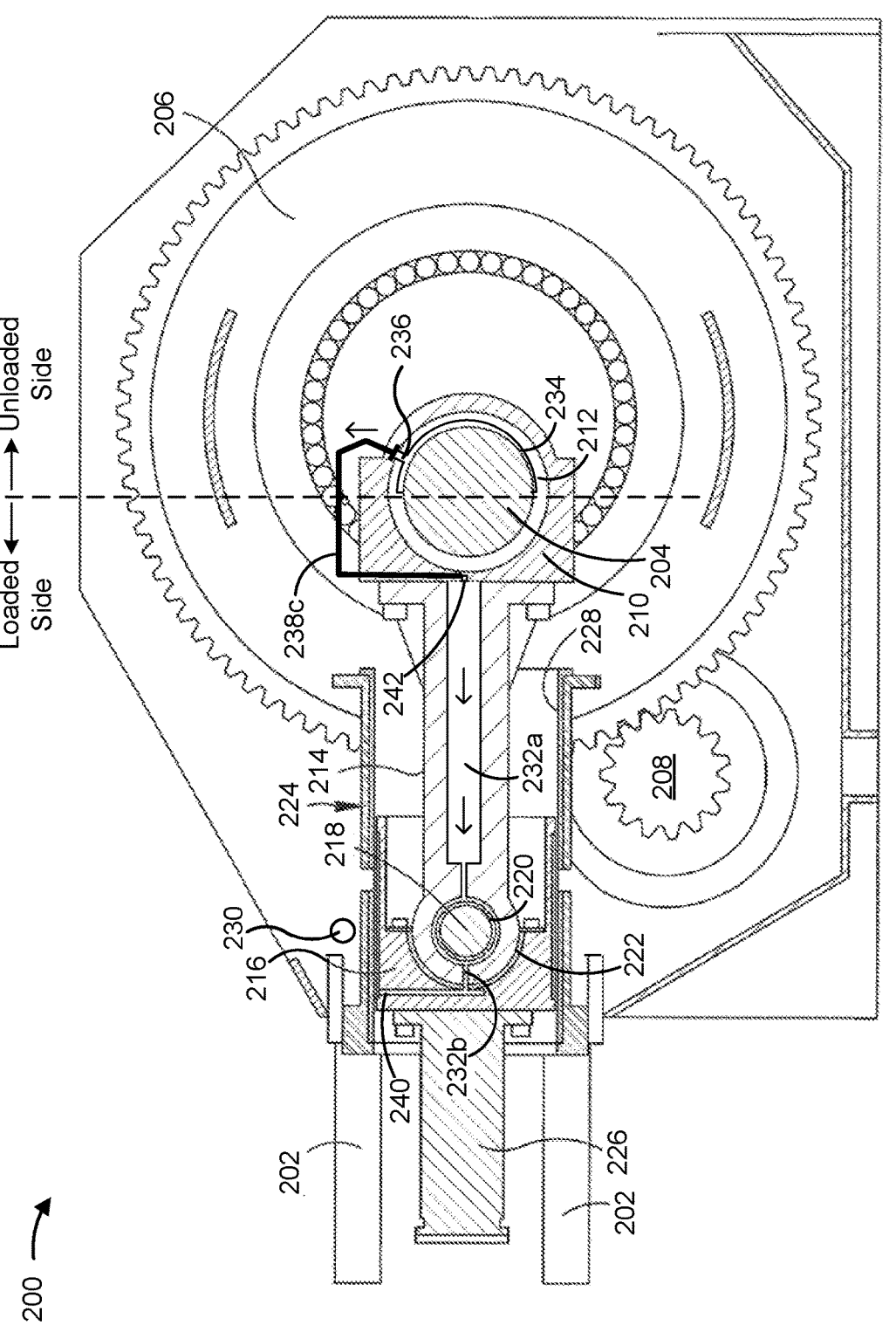
FIG. 4 is a diagram illustrating a sectional view of an alternative example of the pump assembly of FIG. 2.

FIG. 4 is a diagram illustrating a sectional view of an alternative example of the pump assembly 200. As shown in FIG. 4, the pump assembly 200 may include a lubrication conduit 238c that fluidly connects the aperture 236 of the shell bearing 212 to the lubrication channel 232 in the connecting rod 214, in a similar manner as described in connection with FIG. 2. The lubrication conduit 238c may extend, from a section of the shell bearing 212 having the groove 234, to the lubrication channel 232. At least a portion of the lubrication conduit 238c may be external to the bearing housing 210 and the connecting rod 214. For example, as shown, a first portion of the lubrication conduit 238c may be external to the bearing housing 210, and a second portion of the lubrication conduit 238c may extend within the bearing housing 210 to a recess 242 in the bearing housing 210 that is in fluid communication with the lubrication channel 232. The recess 242 may extend partially through the bearing housing 210 so as not to reach the bore in the bearing housing 210 in which the shell bearing 212 is disposed. In some implementations, the lubrication conduit 238c may fluidly connect to the lubrication channel 232 at a location between the second end of the connecting rod 214 and the end of the lubrication channel 232 at the first end of the connecting rod 214, in a similar manner as described in connection with FIG. 2.

As indicated above, FIG. 4 is provided as an example. Other examples may differ from what is described with regard to FIG. 4.

Figure 5:
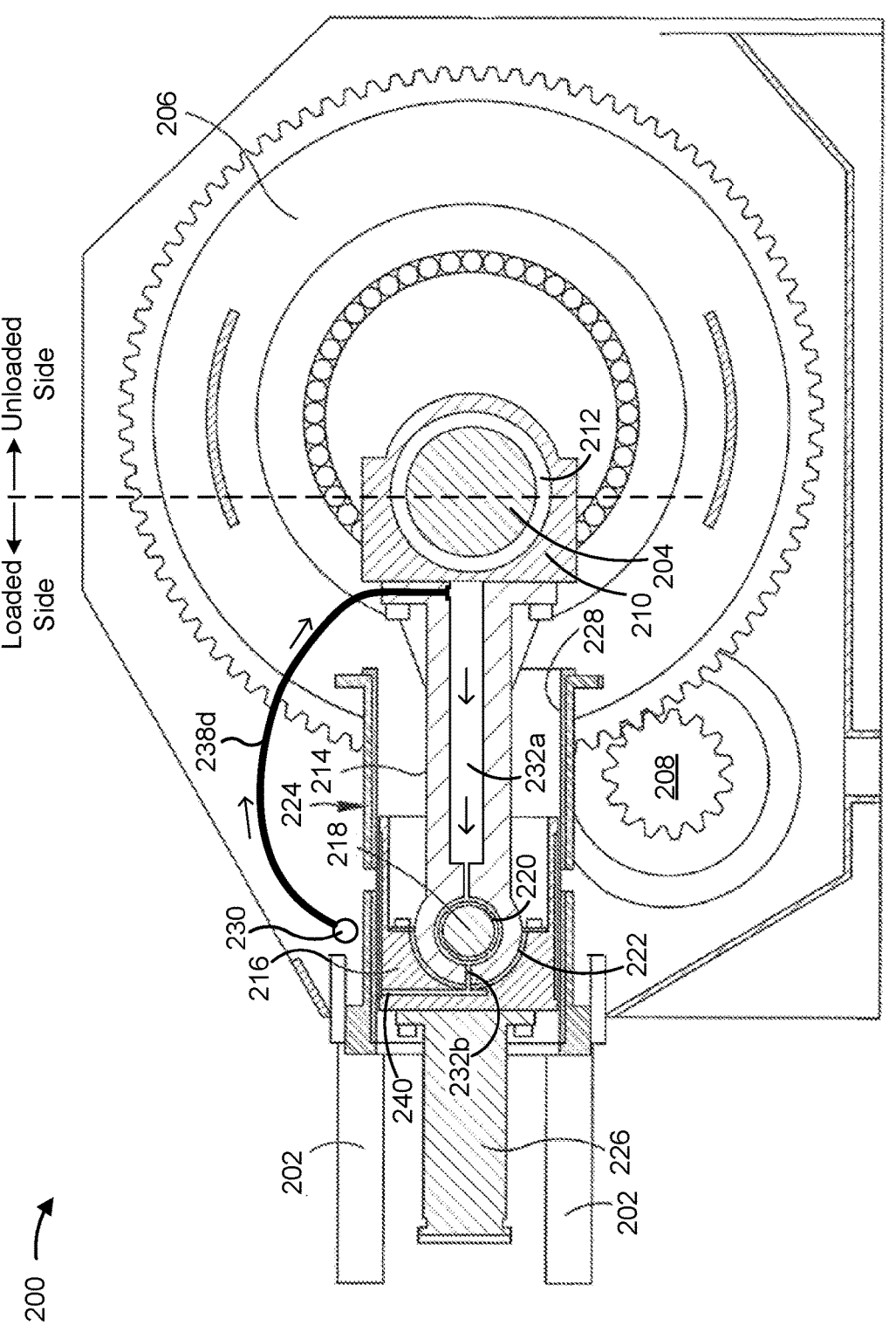
FIG. 5 is a diagram illustrating a sectional view of an alternative example of the pump assembly of FIG. 2.

FIG. 5 is a diagram illustrating a sectional view of an alternative example of the pump assembly 200. As shown in FIG. 5, the pump assembly 200 may include a lubrication conduit 238d that fluidly connects the lubrication bar 230 to the lubrication channel 232 in the connecting rod 214. For example, a first end of the lubrication conduit 238d may be fluidly connected to the lubrication channel 232 and a second end of the lubrication conduit 238d may have a direct fluid connection to the lubrication bar 230 (e.g., the second end of the lubrication conduit 238d may be directly mechanically connected to the lubrication bar 230). As an example, the lubrication conduit 238d may fluidly connect to the lubrication channel 232 at a location between the second end of the connecting rod 214 and the end of the lubrication channel 232 at the first end of the connecting rod 214. Moreover, at least a portion of the lubrication conduit 238d may be external to the bearing housing 210 and the connecting rod 214. As shown in FIG. 5, the shell bearing 212 may not include the aperture 236 when the lubrication conduit 238*d* is employed. In addition, when the lubrication conduit 238*d* is employed, the shell bearing 212 may include the groove 234 or a groove may be absent from the inner surface of the shell bearing 212. For example, the inner surface of the shell bearing 212 may be featureless, or otherwise smooth or uninterrupted. The lubrication conduit 238*d* may be flexible, jointed, and/or include one or more flexible portions to facilitate connection between the lubrication channel 232 of the connecting rod 214 (e.g., at the first end of the lubrication conduit 238*d*) and the lubrication bar 230 (e.g., at the second end of the lubrication conduit 238*d*), which undergo relative movement with respect to each other.

In some implementations, the pump assembly 200 may include the lubrication conduit 238*d* in addition to, or alternatively to, the lubrication conduit 238*a*, the lubrication conduit 238*b*, or the lubrication conduit 238*c*, described herein. In some implementations, a lubrication system may include the lubrication bar 230, the bearing housing 210, the crankshaft 204 (e.g., that includes a lubrication passage from the lubrication bar 230 to the shell bearing 212), the shell bearing 212 (e.g., the groove 234 and/or the aperture 236), the connecting rod 214 (e.g., the lubrication channel 232), and/or the lubrication conduit 238*a*, the lubrication conduit 238*b*, the lubrication conduit 238*c*, or the lubrication conduit 238*d*.

As indicated above, FIG. 5 is provided as an example. Other examples may differ from what is described with regard to FIG. 5.

Figure 6:
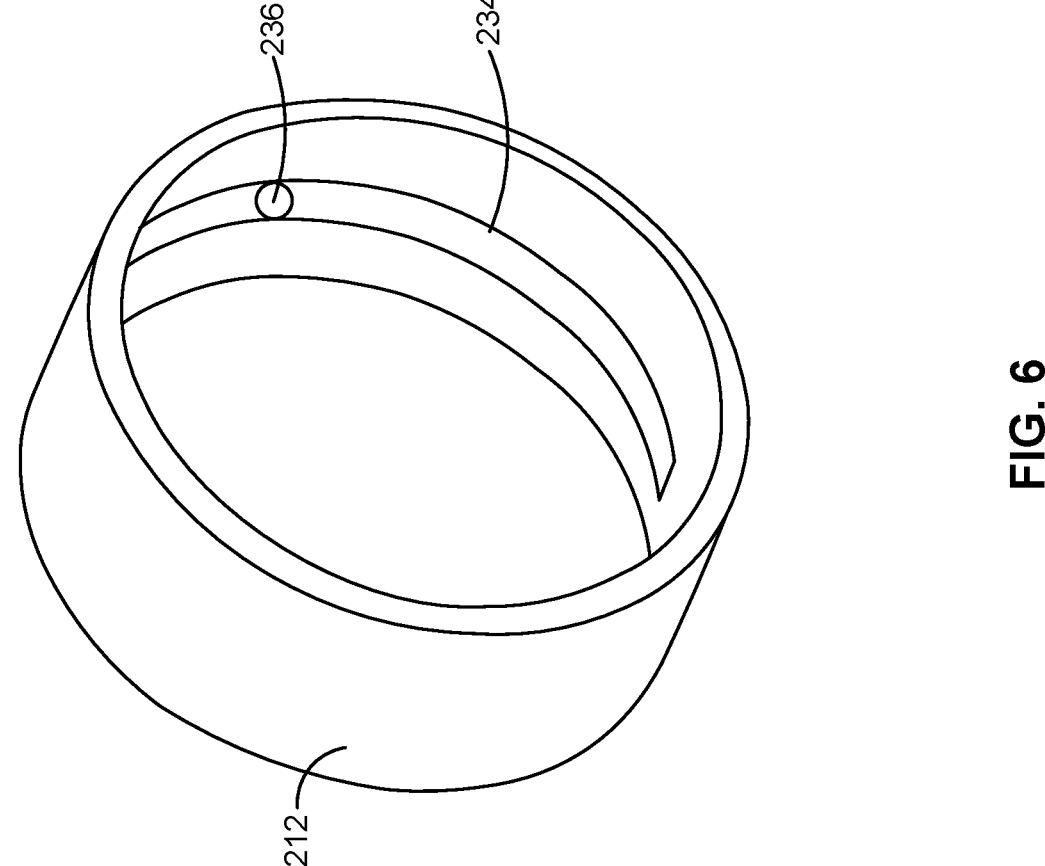
FIG. 6 is a diagram illustrating a perspective view of an example shell bearing.

FIG. 6 is a diagram illustrating a perspective view of an example shell bearing 212. As shown in FIG. 6, the shell bearing 212 may include the groove 234 that extends only partially, circumferentially around the inner surface of the shell bearing 212. As further shown in FIG. 6, the aperture 236 may be located in the groove 234, and the aperture 236 may extend through a wall of the shell bearing 212.

As indicated above, FIG. 6 is provided as an example. Other examples may differ from what is described with regard to FIG. 6.

INDUSTRIAL APPLICABILITY

The pump assembly described herein may be used in any reciprocating pump, such as a hydraulic fracturing pump of a hydraulic fracturing system. For example, the pump assembly may be used in a reciprocating pump having rolling and/or sliding surfaces, such as a shell bearing that facilitates coupling of a crankshaft and a connecting rod as well as a knuckle bearing, a wrist pin, and a wrist pin bearing that facilitate coupling of the connecting rod to a crosshead. The pump assembly may be configured to transport lubrication fluid through the crankshaft to the wrist pin, the wrist pin bearing, and/or the knuckle bearing.

In other pump assemblies, the shell bearing may include a groove that extends fully around an inner surface of the shell bearing. This groove facilitates movement of lubrication fluid to a forward side of the shell bearing for passage to the connecting rod to reach the wrist pin, the wrist pin bearing, and/or the knuckle bearing. In the pump assembly described herein, a groove may be absent from the forward side of the shell bearing. For example, the shell bearing may include a groove extending only partially around an inner surface of the shell bearing on an unloaded side of the shell bearing. In the absence of a groove in the forward side of the shell bearing, the pump assembly may provide lubrication fluid to the connecting rod using a lubrication conduit configured to direct lubrication fluid from the unloaded side of the shell bearing to a lubrication channel in the connecting rod and/or using a lubrication conduit configured to direct lubrication fluid from a lubrication bar to the lubrication channel in the connecting rod, among other examples. Because the groove weakens the shell bearing, the absence of the groove from the forward side of the shell bearing, which receives significant impact from the crankshaft during a forward stroke, improves the strength of the shell bearing, thereby increasing a useful life of the shell bearing.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A pump assembly, comprising:
   a bearing housing having a bore to receive a crankshaft;
   a connecting rod connected to the bearing housing at a first end of the connecting rod and connected to a crosshead at a second end of the connecting rod via a wrist pin,
   the connecting rod including a lubrication channel that extends within the connecting rod;
   a shell bearing in the bore of the bearing housing retaining the crankshaft, the shell bearing having an inner surface, an outer surface, a groove that extends only partially around the inner surface of the shell bearing on a side of the shell bearing opposite the connecting rod, and an aperture located in the groove,
   the aperture extending from the inner surface to the outer surface of the shell bearing on the side of the shell bearing opposite the connecting rod; and
   a lubrication conduit fluidly connecting the aperture in the shell bearing to the lubrication channel in the connecting rod, wherein the inner surface of the shell bearing on the side of the shell bearing opposite the connecting rod is uncontacted by the crankshaft in a forward stroke of the crosshead, and the groove extends halfway or less than halfway around the inner surface of the shell bearing.

2. The pump assembly of claim 1, wherein the lubrication conduit is a flexible hose or a rigid tube.

3. The pump assembly of claim 1, wherein the lubrication conduit is a channel within the bearing housing and the connecting rod.

4. The pump assembly of claim 1, wherein the groove is absent from a portion of the inner surface of the shell bearing that contacts the crankshaft in a forward stroke of the crosshead.

5. The pump assembly of claim 1, wherein at least a portion of the lubrication conduit is external to the bearing housing and the connecting rod.

6. The pump assembly of claim 1, wherein a knuckle is defined at an interface of the second end of the connecting rod and the crosshead, and wherein a knuckle bearing is disposed between the connecting rod and the crosshead at the knuckle.

7. The pump assembly of claim 6, wherein the lubrication channel is configured to direct lubrication fluid from the lubrication conduit to at least the knuckle bearing.

8. A pump assembly, comprising:

a bearing housing having a bore configured to receive a crankshaft;

a connecting rod connected to the bearing housing at a first end of the connecting rod and connected to a crosshead at a second end of the connecting rod via a wrist pin, the connecting rod including a lubrication channel that extends within the connecting rod;

a shell bearing in the bore of the bearing housing retaining the crankshaft, the shell bearing having an inner surface and an outer surface; and a lubrication conduit fluidly connected to the lubrication channel in the connecting rod between the second end of the connecting rod and an end of the lubrication channel at the first end of the connecting rod, wherein the shell bearing has a groove that extends only partially around the inner surface of the shell bearing where the inner surface of the shell bearing, on a side of the shell bearing opposite the connecting rod, is uncontacted by the crankshaft in a forward stroke of the crosshead, and the groove extends halfway or 1 less than halfway around the inner surface of the shell bearing.

9. The pump assembly of claim 8, wherein a first end of the lubrication conduit is fluidly connected to the lubrication channel and a second end of the lubrication conduit has a direct fluid connection to a lubrication bar configured to supply lubrication fluid to a plurality of lubrication conduits.

10. The pump assembly of claim 8, wherein a knuckle is defined at an interface of the second end of the connecting rod and the crosshead, and wherein a knuckle bearing is disposed between the connecting rod and the crosshead at the knuckle.

11. The pump assembly of claim 10, wherein the lubrication channel is configured to direct lubrication fluid from the lubrication conduit to at least the knuckle bearing.

12. The pump assembly of claim 8, wherein at least a portion of the lubrication conduit is external to the bearing housing and the connecting rod.

13. A pump assembly, comprising:

a bearing housing having a bore;

a connecting rod connected to the bearing housing at a first end of the connecting rod and connected to a crosshead at a second end of the connecting rod via a wrist pin, the connecting rod including a lubrication channel that extends within the connecting rod; and a shell bearing in the bore of the bearing housing, the shell bearing having an inner surface and an outer surface, wherein a portion of the inner surface of the shell bearing that contacts a crankshaft in a forward stroke of the crosshead is uninterrupted by a groove or an aperture configured to direct lubrication fluid to the lubrication channel of the connecting rod, and wherein another portion of the inner surface of the shell bearing which is uncontacted by the crankshaft in the forward stroke of the crosshead has the groove and the aperture.

14. The pump assembly of claim 13, further comprising:

a lubrication conduit extending from a section of the shell bearing having the groove and the aperture to the lubrication channel in the connecting rod.

15. The pump assembly of claim 14, wherein the lubrication conduit fluidly connects to the lubrication channel in the connecting rod between the second end of the connecting rod and an end of the lubrication channel at the first end of the connecting rod.

16. The pump assembly of claim 13, wherein a knuckle is defined at an interface of the second end of the connecting rod and the crosshead, and wherein a knuckle bearing is disposed between the connecting rod and the crosshead at the knuckle.

17. The pump assembly of claim 16, wherein the lubrication channel is configured to direct lubrication fluid to at least the knuckle bearing.

18. The pump assembly of claim 13, wherein the lubrication channel in the connecting rod has a first portion that extends from the first end of the connecting rod toward the wrist pin and a second portion that extends from the second end of the connecting rod toward the wrist pin, and wherein the first portion and the second portion are fluidly connected.

\* \* \* \* \*